United States Patent [19]

Key

[11] Patent Number: 4,834,647

[45] Date of Patent: May 30, 1989

[54] METHOD AND APPARATUS FOR CONVEYING CARBON BLACK WHICH INHIBITS THE BUILD-UP OF CARBON BLACK FINES ON CONVEYING SURFACES

[76] Inventor: Ted G. Key, HDR 3, Box 865 F1, New Braunfels, Tex. 78132

[21] Appl. No.: 193,204

[22] Filed: May 9, 1988

Related U.S. Application Data

[63] Continuation of Ser. No. 25,954, Mar. 16, 1987, abandoned.

[51] Int. Cl.⁴ ............................................. F26B 9/18
[52] U.S. Cl. ....................................... 432/11; 432/139; 432/154; 432/239
[58] Field of Search ............... 432/239, 244, 124, 131, 432/135, 139, 140, 154, 11.1; 423/455

[56] References Cited

U.S. PATENT DOCUMENTS

| | | | |
|---|---|---|---|
| 132,243 | 10/1872 | Bruce et al. | 432/154 |
| 986,350 | 3/1911 | Bishop | 432/69 |
| 1,459,923 | 6/1923 | Nagel | 432/139 |
| 1,538,385 | 5/1925 | Daman | 432/154 |
| 1,904,548 | 4/1933 | Schultze | 432/154 |
| 3,999,938 | 12/1976 | Carroll | 432/239 |
| 4,256,453 | 3/1981 | Csapo | 432/239 |
| 4,399,906 | 8/1983 | Millsap | 432/154 |
| 4,504,222 | 3/1985 | Christian | 432/139 |
| 4,606,283 | 8/1986 | DesOrmeaux et al. | 432/139 |

FOREIGN PATENT DOCUMENTS 112686 8/1900 Fed. Rep. of Germany ...... 432/154

Primary Examiner—Henry C. Yuen
Attorney, Agent, or Firm—Cox & Smith Incorporated

[57] ABSTRACT

A method and apparatus for conveying carbon black pellets to avoid breaking up the pellets and inhibit caking on the conveying means which may be a screw type conveyor that is sufficiently heated to inhibit caking of the carbon black. The conveying means is centerless ground to maintain uniform distances of relatively moving parts and the contact surfaces are electroless plated to further inhibit caking of the carbon black on the conveying means.

7 Claims, 1 Drawing Sheet

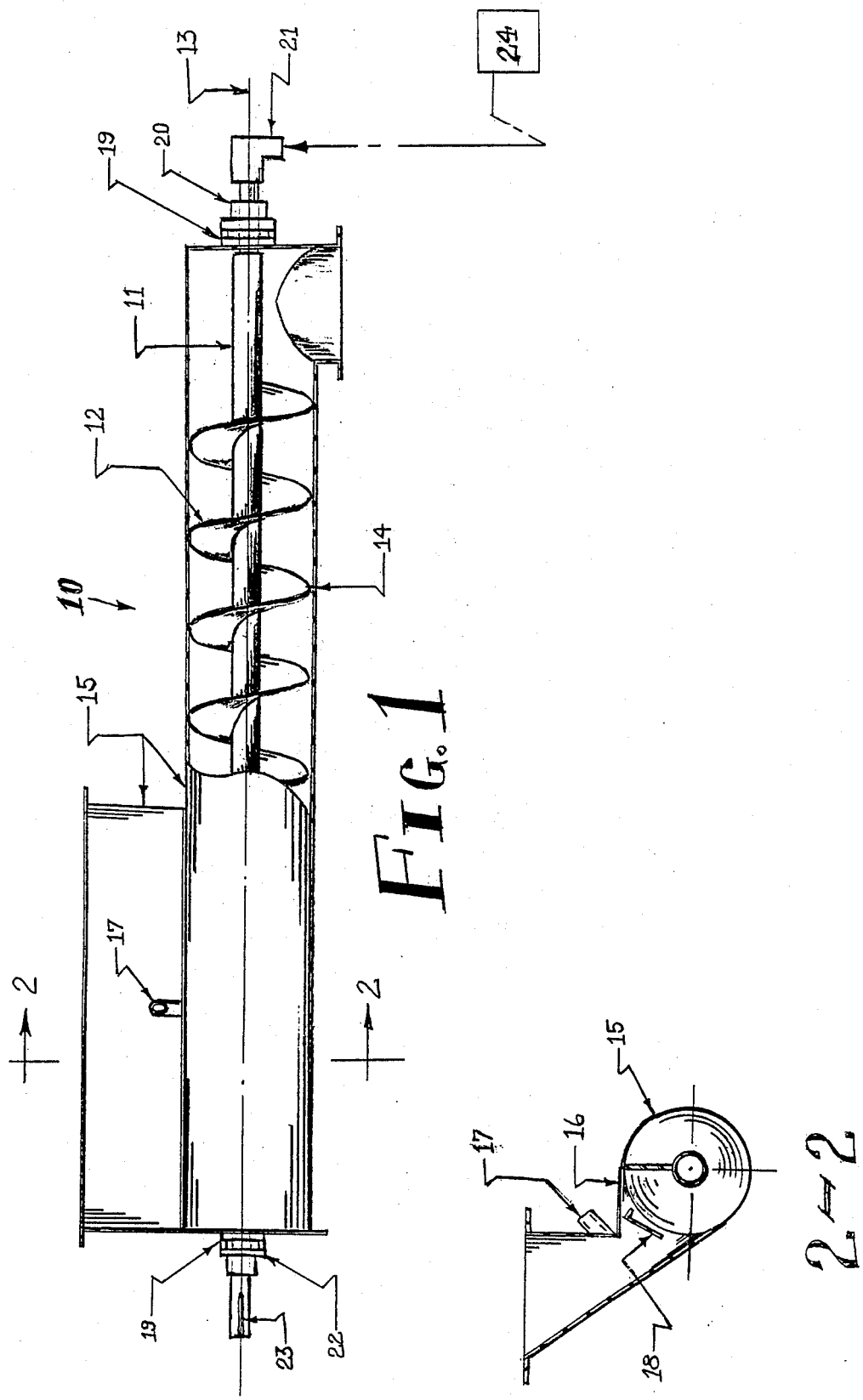

METHOD AND APPARATUS FOR CONVEYING CARBON BLACK WHICH INHIBITS THE BUILD-UP OF CARBON BLACK FINES ON CONVEYING SURFACES

This application is a continuation of my co-pending application Ser. No. 25,954, filed on Mar. 16, 1987 now abandoned.

BACKGROUND OF THE INVENTION

The problem with degradation and breakage of the carbon black pellets and the build-up of carbon black dust and fines on surfaces of the handling apparatus has existed since the beginning of automated feeding and weighing of carbon black for the injection into a mixer.. This problem has become even more critical in recent years due to the more sophisticated and unique rubber compounds. These newer compounds require softer, more fragile carbon black pellets which, due to their softer nature, will disperse more thoroughly into the rubber batch. As the sophistication of rubber compounding technology has increased, complete dispersion of the carbon black is more critical than ever before. The softer the pellets, the more complete the dispersion within a given time frame during the mixing process.

In rubber mixing, various ingredients are injected into a mixer to be compounded into the rubber. By its nature, carbon black will not mix well in its original form. As produced, carbon black is a very fine (micron size) powder. If injected into the mixer in that form, it will simply float on top of the rubber and will not mix into the rubber batch. In order to overcome this problem, the carbon black, at the point of manufacture, is made into pellets. In the pellet form, the carbon black will then mix well into the rubber. First, the pellets themselves will mix, then the pellets will break down into powder and the powder will complete the total dispersion of the carbon black in the rubber batch. The making of the pellet is in itself a science. These small pellets are made according to very close specifications. By their hardness, mass strength, elasticity, as well as other technical considerations, mixing performance can be determined.

These pellets are extremely fragile and easily broken. When broken, the pellets become powder (normally called "fines"). As in their original form, these powders will not disperse into the batch, but rather will "float" on top of the rubber. These pockets of powders become major flaws in the final product which most often causes the total product to be scrapped. Secondly, when high concentrations of fines are allowed to enter the mixer the time involved to mix the batch can become indeterminate, thereby extending the manufacturing time to unacceptable levels. Further, the mixing requires very specific time and temperature control, otherwise the rubber will "cure" inside the mixer due to the higher temperatures reached during an extended mixing time. It therefore becomes highly significant to the success of the mixing operation that the pellets be handled in the most gentle manner possible, that any dust (fines) not be allowed to accumulate within the handling and feeding equipment where it may break away and be fed into the mixer.

When the pellets are broken, the resultant powders (fines) are highly prone to adhering to any surface with which they come into contact. This occurs primarily at any point within the system where material must be held for further process. The carbon black is metered closely by weight in conformance with a precise recipe, dependent upon the type of rubber compound being mixed. In the typical operation, a batch weight ranging from a few pounds to 500 or more may be required, with a tolerance of plus or minus 1% of total batch weight. The bulk densities of the carbon black pellets may vary from 20 to 45 pounds per cubic foot. These weights, once conveyed into the weight hopper, with variables both in bulk density and total amount must be fed within a very specific cycle time, usually less than 90 seconds. Should this time cycle become unpredictable, all downstream operations are jeopardized. The mixing process is a closely timed, continuous operation, each step dependent upon the timely completion of all preceding steps in the operation.

The "fines", if allowed to accumulate within the feeders create significant problems. First, the build-up within the feeders will break away from surfaces, be fed to the scale and injected into the mixer where it will not mix thoroughly, creating very high reject levels in the final product. Secondly, the build-up chokes off the feeder, thereby reducing the ability of the feeder to deliver accurate amounts within the required time. Further, extreme levels of build-up on feeder surfaces may create excessive maintenance shut-down time for cleaning and servicing the feeder.

As far as is known, there have been many attempts to use various types of flite configurations on screw-type feeders. Some types of known screw flites are as follows: The tapered pitch may be utilized for an even withdrawal from the bin. The profile of the screw in this situation is tapered toward the feed end. Another type is the graduated pitch section whereby the space between the flites gradually increases across the feed section so that material will enter the feeder evenly. There have also been attempts made to use rotary feeders. This is a vane type feeder whereby the rotor is essentially a star type design which accepts materials within the vanes and rotates to dump the load directly below. There have also been numerous attempts to use other types of feeders. In attempts to prevent the black being abraded against surfaces within screw feeders, various belt conveyor configurations have been tried. There have also been numerous types of pneumatic feeders which attempt to fluidize the materials and thereby not require any direct contact with any hard surfaces. Further attempts to prohibit build-up and pellet breakage have included vibrators, inclines, stainless steel and polished surfaces, synthetic coatings and laminations. In addition to these mechanical attempts, there have been several methods of applying different electrical charges to various parts of the equipment in order to control the ionic attraction of the material. These attempts have often added to the problem rather than contributing to the solution.

In reviewing the pellet making process, I learned that in the manufacturing process of making carbon black and pelletizing it, there are generally fewer problems with the material sticking to the handling equipment. A possible reason for this is because during the pelletizing process, the pellets are dried by hot air driers which substantially elevate the temperature of the pellets to drive off moisture used in pelletizing. The hot carbon black during the manufacturing process generally does not stick to the handling equipment. The purpose of the heating was not to avoid sticking but to evaporate the water from the pellets.

This invention solves the problem of the carbon black pellets sticking to the handling equipment during the rubber manufacturing process by the use of sufficient heat to repel the micron size particles. The heat is believed to accomplish the task due to several events. It apparently significantly reduces the kinetic friction between the flite surfaces and the carbon black particles being conveyed. The reduced kinetic friction reduces greatly the abrading of the pellets and minimizes the opportunity for ionic attraction and minimizes charge transfer during movement of the feeder screw. Also carbon black dust is hygroscopic. The heated surface upon which it is conveyed minimizes the opportunity for the particles to adhere due to surface moisture within the dust particles.

The entire screw assembly is electroless nickel plated in order to provide a surface least likely to provide the initial opportunity for the adhesion of dust to the flite due to higher kinetic friction. Prior methods of trying to solve the problem does not understand nor contemplate the use of a predetermined amount of heat nor do they use the other features of this invention. There have been a number of screw feeders and conveyor configurations in the past used for different purposes which may include a heated surface. However, with these devices, as far as is known, the purpose of the applying of heat is to heat the material being conveyed or for a specific treatment purpose. An object of the present invention is to prohibit the adhering of carbon black to the feeder surfaces of a screw type or other type conveyor by just using sufficient heat.

Another object of this invention is to minimize the opportunity for creating fines within the feeder. The design of the unit provides for a true perimeter along the entire length of the screw. The screw is centerless ground at a specific diameter about the centerline over its entire length, thereby prohibiting the flite edges from grinding the fragile pellets between the flite edges and the housing due to any eccentric movement of the flites.

The speed of the feeder is closely controlled. It is believed that carbon black pellets will begin their greatest degradation and build-up at the point the speed of the conveying flite exceeds 180 ft/min. peripheral speed of the screw. By maintaining a lowered speed, together with the plated and heated flite surface, low friction and minimum degradation is provided.

By inhibiting the build-up on the flite surfaces, the feeder is able to maintain its design feed rate so that a consistent and predictable mixing cycle time is provided. Another object is to improve the quality of the mixes and inhibiting of fines concentrations entering the weigh scale which in other feeders come from build-up breaking away from internal feeder surfaces. Another object is to minimize maintenance demands in service shut-downs due to inability to repel carbon black from caking on the surface of the feeder.

Other objects of the invention will be apparent from the following detailed disclosure.

SUMMARY OF THE INVENTION

The invention relates to a method and apparatus for volumetrically conveying carbon black pellets during a rubber making process. Heat is applied to the conveying mechanism in the amount just sufficient to inhibit the caking up of fine carbon black particles to the conveying equipment which impedes the operation of the feeding equipment and creates defects in the final product. In addition to heat, the invention contemplates continuous welded flites which are polished smooth and electroless nickel plated. The polished conveying surfaces and heated shaft and flites help inhibit the fines from being attracted by and adhering to the conveying surfaces. Centerless ground edges of the flites insure against wobble of the flite edges within the material to minimize grinding the fragile pellets within the conveying housing. A relatively slow conveying speed minimizes the turbulence within the feeder to provide the optimim given point contact within the feeder which might damage the very fragile pellets.

BRIEF DESCRIPTION OF THE DRAWING

FIG. 1 is a partial side view showing in broken section a screw-type conveyor of the type which may be used in the invention.

FIG. 2 is a cross-section of the feeder taken along, line 2—2, in FIG. 1.

DETAILED DESCRIPTION OF THE INVENTION

Referring to FIG. 1 on the invention there is shown a screw-type conveyor which includes a central hollow shaft 11 and spiral flite 12. The shaft 11 is rotatably mounted in bearings 20 with seals 19 about a center line 13. The flites 12 are circular as shown in the cross-section in FIG. 2.

Particular attention must be paid to the fabrication, quality, workmanship, finish work, and assembly of the unit prior to installation. A graduated pitch feed section is provided. Beginning at the feed end, pitch may be in the order of 4" and then in a continuous manner increase gradually in pitch to a full pitch near the end. The design speed for the feeder is generally in the order of that determined not to allow the peripheral speed of the flites to exceed 180 ft/min. It is believed that better results are achieved when 180 ft/min peripheral speed is not exceeded. The feed section housing and trough 15 may be fabricated from a good grade of stainless steel. Access doors 16 for inspection, observation, and maintenance may also be provided. All the fliting 12 is generally helicoid type and continuous welded from both sides.

The screw, after assembly and welding of the flites, may be either centerless ground or lathe turned to provide a true perimeter run-out of small variance. After assembly, grinding and polishing smooth, the entire screw assembly 11 may be electroless nickel or hard chrome plated. The screw shaft assembly 11 may consist of a seamless tube, with solid shaft ends welded in place that are machine turned with a keyway 23 and drilled at one end to accommodate a swivel unit 21. The screw shaft assembly should conform to ASME code for unfired pressure vessels capable of containing the heat and heat source. The bearings will be of the high temperature sleeve type. The finished clearance between flite tip 14 and the housing should be small in the order of about 1/16 inch. The discharge end of the screw assembly may be bare of fliting at the last part. The shaft and drive end may be suitably reinforced to accommodate a bronze thrust bearing 22. The conveying section unit will generally have a hinged, dust tight cover 16 so that unit can be easily opened for service, observation, and maintenance as shown in FIG. 2.

During the fabrication, assembly, and finish work of the feeder, it is preferable that all internal surfaces of the housing 15, flite 12, and shaft 11 be free of any mill scale, weld slag or splatter and that all internal welds be ground smooth and polished. A suitable number of sampling ports 17 may be installed which will allow the introduction of a sampling device which the unit is running. The inlet throttle device 18 should preferably be removable and be fabricated of a highly polished stainless steel or non-porous, high polish material.

Other alternative forms for the feeder might be of a similar configuration. The general source 24 of heat would be conventional steam but it would also be possible to utilize electric heat as well.

While it has been known before to have screw feeders and conveyor configurations which may include a heated shaft, the purpose of the heat in this invention is just that amount which will impart enough heat to lower the kinetic friction, minimize ionic attraction and prevent moisture induced adhesion of micron size particle of the product being conveyed from caking and building up on the feeder surfaces. The primary purpose of the heat is to repel the micron size particles of the carbon black from the feeder surfaces. In addition to the heat providing the repelling, the surfaces of the feeder should be extremely smooth and preferably electroless nickel plated.

In order to minimize grinding or breaking up of the carbon black particles, it is preferable that the shaft and flites be true and straight. This is accomplished by centerless grinding of the shaft/flite assembly in order to see that it does not grind the blacks between the screw perimeter and the housing 15 due to eccentric motion within the housing.

The heat, as applied to the shaft, is sufficient to inhibit the sticking to the conveying surfaces of the micron size carbon black particles. Once the particles are allowed to stick, the build-up may become very rapid to the point the feeder will virtually cease moving material. The fines are also inhibited from adhering to the surface by the smoothing of the potentially abrasive surface of the flites against the fragile pellets. Centerless grinding of the feed screw assembly to make it true also helps to inhibit the generation of fines. Heat may be applied to the interior of the shaft 11 to maintain a surface heat in the order of 200 degrees F. As mentioned above, the rotational speed is kept to a maximum so as to allow no more than 180 ft/min peripheral speed of the screw. The source of heat may be a steam generator 24 which conducts steam to the hollow shaft 11 which in turn heats the shaft and flites which act as radiator fan.

The advantages of the invention are that the batch quality and consistency are improved due to an improved quality of carbon black delivered to the mixer through the feeder. This is in part due to the small fines percentage and absence of lumps and chunks of fines. The apparatus generally requires less maintenance, thereby reducing costs, production delays, and down time on the mixer and downstream manufacturing processes. With fewer shut-downs for service, the unit is cleaner, creates less atmospheric pollution within the plant due to the greatly reduced opportunity for spillage within the process area. With the benefit of a constant feed rate, overall per unit cost of the final product costs are lessened and stabilized. The constant feed rate assures a more predictable, thereby a more efficient production and planning and control capability. The better and more consistent batch quality provides a lower per unit cost due to greatly reduced scrap level in the final product.

Applicant's patent application entitled "A Method And Apparatus For The Receiving Of Carbon Black Pellets For Weighing Prior To Injection Into A Mixer Which Inhibits The Accumulation Of Carbon Black Fines On Internal Surfaces" filed Mar. 16, 1987, is incorporated herein in total by specific reference thereto.

Although the invention has been described in conjunction with the foregoing specific embodiment, many alternatives, variations and modifications will be apparent to those of ordinarily skill in the art and those alternatives, variations and modifications are intended to fall within the spirit and scope of the appended claims.

What is claimed is:

1. A method for conveying carbon black pellets for subsequent compounding into a rubber mixture as part of a rubber making process comprising the steps of:
    feeding carbon black pellets to a conveying apparatus;
    heating the surfaces of the conveying apparatus which contact the pellets and thereby inhibiting the caking and adhesion of carbon black fines to the surfaces of the conveying apparatus; and
    dispensing the carbon black pellets from the conveying apparatus into the rubber mixture.

2. The method of claim 1 wherein the pellets are fed to a screw-type conveyor having a hollow shaft and spiral flites and further wherein the flite surfaces are heated by heating the shaft of the conveyor therebeing a thermally conductive path between the shaft and the flites which contact the carbon black pellets.

3. The method of claim 2 wherein the heating of the conveyor shaft is accomplished by forcing steam through a conduit within the shaft.

4. The method of claim 3 wherein the conveyor shaft and flite assembly is continuously welded and centerless ground.

5. The method of claim 4 wherein the conveyor is operated so that the peripheral speed of the flites is no greater than 180 feet per minute.

6. The method of claim 5 wherein the steam is at a pressure in the order of 150 pounds per square inch and at a temperature in the order of 350° Fahrenheit.

7. The method of claim 1 wherein the surfaces of the conveying apparatus are maintained at a temperature between 150° and 400° Fahrenheit.

* * * * *